United States Patent Office 3,264,244
Patented August 2, 1966

3,264,244
SOLID LOW MOLECULAR WEIGHT VINYL TOLUENE POLYMERS
Arnold Edwin Ambler and Arthur Topham, Manchester, England, assignors to Imperial Chemical Industries Limited, London, England, a corporation of Great Britain
No Drawing. Filed June 3, 1963, Ser. No. 284,853
Claims priority, application Great Britain, Dec. 19, 1960, 43,565/60
6 Claims. (Cl. 260—29.6)

This application is a continuation-in-part of application Serial No. 156,511 which was filed on December 1, 1961, now abandoned.

It is an object of the invention to provide polymers which are valuable in the manufacture of readily dispersible pigment compositions. The new polymers are solid at ordinary atmospheric temperatures and readily soluble in most organic media, even in "white spirit" (a petroleum fraction with an approximate boiling range of 150° to 200° C.) which is a common constituent of alkyd resin paints.

It is a further object of the invention to provide vinyltoluene polymers having the molecular weight in the range of 1000 to 3200. Such polymers are entirely different in properties from the known polyvinyltoluenes of high molecular weight which are suitable materials for the manufacture of plastic objects.

According to the invention we provide polymers having a number average molecular weight in the range of 1000 to 3200 and being essentially derived from monomeric material selected from the class consisting of meta- and para-vinyltoluenes and mixtures thereof.

According to a further feature of the invention we provide a process for the manufacture of polymers in the form of aqueous latices comprising emulsion polymerization of monomeric material selected from the class consisting essentially of meta- and para-vinyltoluenes and mixtures thereof, the emulsion polymerization being carried out in the presence of from 0.04 to 0.15 mole of alkyl mercaptan per mole of monomer.

The monomeric material used in the process of the invention may be pure meta-or para-vinyltoluene, but it is preferred to use the mixture of meta- and para-vinyltoluenes which is commercially available as "vinyltoluene." This mixture usually contains about 65% of the meta isomer and 35% of the para isomer. Small amounts, for example, up to about 10% of other co-polymerizable monomers may be tolerated without materially affecting the properties of the product. For example, the monomeric material may contain up to 10% of styrene, halogenostyrene, alkoxy styrene, acrylonitrile, butadiene, methacrylonitrile, alkyl acrylate, methacrylate or fumarate or methylvinylketone.

The alkylmercaptan used in the process of our invention functions as a chain transfer agent. As examples of alkylmercaptans which may be used there may be mentioned t-amyl and t-dodecyl mercaptans.

The process of the invention may conveniently be carried out by adding a mixture of monomer and chain transfer agent to a stirred aqueous solution containing an initiator, for example potassium persulphate, and a dispersing agent, for example potassium stearate or Turkey red oil. Suitable operating temperatures are between 50° and 100° C. and the mixture may be stirred, for example between 1 and 2 hours. In this way a latex of the polymer is formed and such latices form a further feature of our invention.

If desired the polymers of the invention may be isolated from the latex by flocculation (for example by the addition of hydrochloric acid) followed by filtration, washing and drying.

The molecular weight of the polymers obtained by the process of our invention may be calculated from a knowledge of the amount of alkylmercaptan used. The method of calculation is that described by Snyder, Stewart, Allen and Dearborn (Journal of the American Chemical Society, 1946, vol. 68, pages 1422–1428) for calculating the molecular weights of polystyrenes.

The new polymers of the invention being solid at ordinary atmospheric temperatures and being soluble in white spirit, are useful in the manufacture of dispersible pigment compositions, for example by the process of Belgian Patent No. 598,711. In that process an aqueous dispersion of a pigment is flocculated in the presence of a latex of a synthetic polymer which in the dry state is miscible with the medium in which it is desired to disperse the pigment. Pigment compositions obtained by using the polymers of the present invention in the process of Belgian Patent No. 598,711 are solid and convenient to handle and are readily dispersible in alkyd resin paint media.

Latices of the new polymers having a particle size between 0.01 micron and 0.5 micron are especially valuable for use in the manufacture of pigment compositions by the process of Belgian Patent No. 598,711. Within these limits, the smaller particle sizes are obtained by using larger quantities of the dispersing agent e.g. potassium stearate and by operating at high pH e.g. a pH of about 11.

The invention is illustrated but not limited by the following Examples in which the parts are by weight:

*Example 1*

A mixture of 50 parts of stearic acid, 161 parts of 9.2% potassium carbonate solution and 1770 parts of water is stirred at 80° C. 1 part of potassium persulphate is added and the air in the reaction vessel is displaced by nitrogen. A mixture of 50.9 parts of t-dodecyl mercaptan and 449.4 parts of commercial vinyltoluene (containing 64.6% m-vinyltoluene and 35.4% p-vinyltoluene) is added during 1 hour and 25 minutes. After stirring at 80° for a further hour the latex is cooled. The particle diameter of this latex, as determined by electron micrography is 0.1 micron.

The latex may be flocculated by addition of dilute hydrochloric acid, and the polymer isolated by filtration, washing and drying. A solid polymer is obtained which is readily soluble in white spirit. The calculated number average molecular weight of the product is 1985.

*Example 2*

A mixture of 16.7 parts of stearic acid and 600 parts of water is stirred at 80° C. while 9.6 parts of 30% sodium hydroxide solution is added, followed by a solution of 0.33 part of potassium persulphate in 34 parts of water. The air in the reaction vessel is displaced by nitrogen, and a mixture of 17 parts of t-dodecyl mercaptan and 149 parts of commercial vinyltoluene is added during 1 hour. After stirring at 80° for a further hour, the latex is cooled. The particle diameter is 0.02–0.03 micron.

The latex may be flocculated by addition of dilute hydrochloric acid, and the polymer isolated by filtration, washing and drying. A solid polymer is obtained which is readily soluble in white spirit. The calculated number average molecular weight of the product is 1973.

In place of commercial vinyltoluene in Examples 1 and 2 pure m- or p-vinyltoluene may be used. The solid polymers obtained are readily soluble in white spirit.

Solid polymers readily soluble in white spirit are also obtained by using in place of commercial vinyltoluene in Examples 1 and 2 a mixture consisting of 95% of commercial vinyltoluene and 5% of styrene or a mixture consisting of 90% of commercial vinyltoluene and 10% of styrene. Similarly solid polymers soluble in white spirit may be obtained by using mixtures containing commercial vinyltoluene and small amounts of p-chlorostyrene, p-bromostyrene, 2,5-dichlorostyrene, p-methoxystyrene, acrylonitrile, butadiene, methacrylonitrile, methyl, ethyl or propyl acrylate, methacrylate or fumarate or methylvinylketone.

In place of dodecyl mercaptan in Examples 1 and 2 a stoichiometrically equivalent amount of n- or t-butyl mercaptan, n- or t-amyl mercaptan or t-octyl mercaptan may be used.

In Examples 1 and 2, 0.066 mole of t-dodecyl mercaptan are used for each mole of vinyltoluene. Solid polymers readily soluble in white spirit are also obtained by using 0.15 mole of t-dodecyl mercaptan per mole of vinyltoluene. The calculated molecular weight of the products obtained in this way is 1000. When larger proportions of t-dodecyl mercaptan are used the polymers obtained are not completely solid at ordinary atmospheric temperature. Solid polymers readily soluble in white spirit are also obtained by using 0.04 mole of t-dodecyl mercaptan per mole of vinyltoluene. The calculated molecular weight of a product obtained in this way is 3150. When smaller proportions of t-dodecyl mercaptan are used, the polymers obtained, though solid, are not readily soluble in white spirit.

We claim:

1. Normally solid polymers having a number average molecular weight in the range 1000 to 3200 and being essentially the product obtained by the free radical emulsion polymerization of monomeric material selected from the group consisting of meta-vinyltoluenes, para-vinyltoluenes and mixtures thereof.

2. Aqueous latices of the polymers claimed in claim 1, wherein the particle size of the polymer is between 0.01 micron and 0.05 micron.

3. Normally solid polymers having a number average molecular weight in the range 1000 to 3200 and being essentially the product obtained by free radical emulsion polymerizing a first monomeric material selected from the group consisting of meta-vinyltoluenes, para-vinyltoluenes and mixtures thereof and mixtures of the first monomeric material with up to 10% of a second monomeric material selected from the group consisting of styrene, halogenostyrenes, alkoxystyrenes, acrylonitrile, butadiene, methacrylonitrile, alkylacrylates, alkyl methacrylates, alkyl fumarates and methylvinylketone.

4. Aqueous latices of the polymers claimed in claim 3, wherein the particle size of the polymer is between 0.01 micron and 0.05 micron.

5. A process for the manufacture of normally solid vinyltoluene polymers of a number average molecular weight in the range 1000 to 3200 in the form of aqueous latices comprising free radical emulsion polymerizing monomeric material selected from the group consisting of meta-vinyltoluenes, para-vinyltoluenes and mixtures thereof, in the presence of from 0.04 to 0.15 mole of alkyl mercaptan per mole of monomer.

6. A process for the manufacture of normally solid vinyltoluene polymers of a number average molecular weight in the range 1000 to 3200 in the form of aqueous latices comprising free radical emulsion polymerization of a first monomeric material selected from the group consisting of meta-vinyltoluenes, para-vinyltoluenes and mixtures thereof and in mixture with said first monomeric material, up to 10% of a second monomeric material selected from the group consisting of styrene, halogenostyrenes, alkoxystyrenes, acrylonitrile, butadiene, methacrylonitrile, alkyl acrylates, alkyl methacrylates, alkyl fumarates and methylvinylketone.

References Cited by the Examiner
UNITED STATES PATENTS

| | | | |
|---|---|---|---|
| 2,643,995 | 6/1953 | Park | 260—87.3 |
| 2,987,508 | 6/1961 | Ruffing et al. | 260—87.3 |
| 3,100,763 | 8/1963 | Meek et al. | 260—93.5 |

OTHER REFERENCES

Kennedy et al.: J. Chem. Soc. (London), 1949, pp. 2383–2389.

Bounty et al. (editors): "Styrene, Its Polymers, Copolymers and Derivatives," pp. 763–766 and 1237–1244, Reinhold Corp., N.Y.

JOSEPH L. SCHOFER, *Primary Examiner.*

W. HOOVER, *Assistant Examiner.*